Sept. 5, 1950   G. SPERLING   2,521,612
THERMOSTATIC VALVE

Filed Aug. 12, 1947   2 Sheets-Sheet 1

INVENTOR.
Gustav Sperling
BY Mock & Blum
ATTORNEYS

Sept. 5, 1950  G. SPERLING  2,521,612
THERMOSTATIC VALVE

Filed Aug. 12, 1947  2 Sheets-Sheet 2

INVENTOR
Gustav Sperling
BY
Mocker Blum
ATTORNEYS

Patented Sept. 5, 1950

2,521,612

UNITED STATES PATENT OFFICE 2,521,612

THERMOSTATIC VALVE

Gustav Sperling, Los Angeles, Calif.

Application August 12, 1947, Serial No. 768,237

6 Claims. (Cl. 236—99)

This invention relates to thermostatically operated means for the control of the flow of a fluid through a conduit. It is applicable primarily to refrigerators and will be described hereinafter, by way of example, in connection therewith. However, it should be understood that the invention is capable of a much wider application and can generally be made use of in every case where the flow of a fluid is to be controlled in dependence upon the temperature prevailing at a given place. For example the invention may be used in connection with drying apparatus wherein steam or hot air or other gas is used as a heating medium; room heating systems operated with steam, hot air, hot water or oil; burners where the flow of fuel and/or air (or oxygen) is automatically to be regulated in accordance with the temperature of the flame, and other similar purposes. It is to be understood that the invention extends to all these and other possible applications.

For the thermostatical control of the flow of a fluid, and particularly in the case of refrigerators in which it is the flow of the refrigerant through the evaporator that is so controlled, use has so far been made of electromagnetic (solenoid) valves which are operated by the thermostat and function so as to close part or whole of the evaporator tubes. This arrangement has among other things, the following drawbacks:

(a) It is impracticable where the refrigerating machine is driven not by an electric motor but by an oil engine or in any other way;

(b) The solenoid valve has two positions only, namely entirely open and entirely closed. Where a gradual control of the flow of the refrigerant is desired, this can only be achieved by the use of several valves operated by several thermostats (or multi-step thermostat) adjusted for narrow temperature steps.

The object of this invention is to provide thermostatically operated valves for the control of the flow of fluids, which valves do not require the use of electric current for their operation.

Another object of the invention is to provide a thermostatically controlled valve operated by members set in reciprocating motion by the action of the thermostat.

A yet further object of the invention consists in providing a thermostatically controlled valve of the character described by means of which the flow of the fluid is gradually regulated between a maximum limit (full flow) and a minimum limit (minimum flow or no flow at all).

With these and other objects in view, my invention consists in the thermostatically operated flow control device of which some practical embodiments are described hereinafter, by way of example only, with reference to the accompanying drawings in which—

Figure 1:
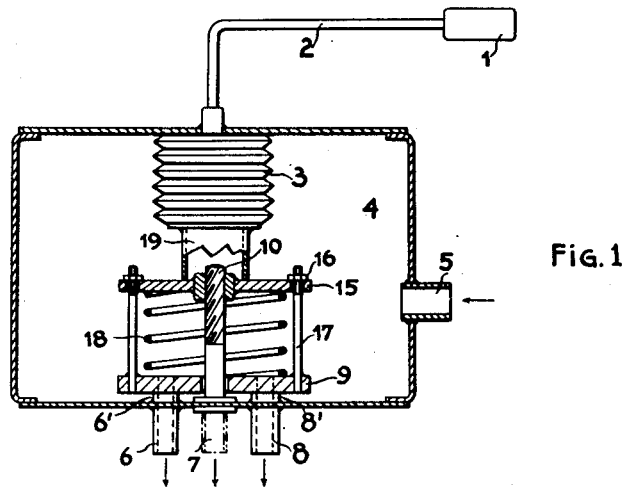
Fig. 1 is a partial sectional elevation of a first embodiment of the invention.

Turning first to Fig. 1, the embodiment of the invention here illustrated comprises a usual thermostatic bulb 1 filled with a substance in the gaseous and/or liquid state, e. g. methyl chloride, which expands and contracts in accordance with the temperature prevailing at the place where the bulb is located. As is customary with refrigerators, the bulb is mounted within the refrigerated space at a point where a certain temperature is to be maintained, and its filling is so calculated that a certain pre-determined pressure exists at the temperature to be maintained. The bulb is connected by a capillary tube 2 to a bellows-like pliable member 3 which is completely closed but for its connection with tube 2 and, accordingly, is contracted or distended as the pressure of the thermostat filling drops or rises whereby its bottom is made to carry out reciprocating movements. The member 3 is mounted within a chamber 4 which forms part of the refrigerant conduit and comprises an inlet connection 5 located in a side wall, and three outlet connections 6, 7 and 8 located in the bottom wall. The three outlet connections are arranged near one another and extend into the chamber where they form bosses 6', 7' and 8' the upper ends of which are all situated in the same horizontal plane and serve as seats for a rotary disc or slide valve 9. The latter (see also Fig. 2) has a central aperture 11 and three circular ports 12, 13 and 14, corresponding in size and relative position to the three outlets 6, 7 and 8 respectively. Through the aperture 11, a vertical pin 10 projects which is fixed to the bottom of the chamber and has a high-pitched thread cut into it. This receives the internally threaded hub of a disc 15 (the term "disc" is meant to comprise all equivalents, e. g.

a wheel or spider or two aligned arms) which has apertures 16 through which pass loosely the upright rods 17 fixed to the valve disc 9. A compression spring 18 is inserted between discs 9 and 15. By the rods 17, discs 9 and 15 are so coupled to each other that on the one hand they can rotate as a unit about the threaded pin 10 but neither can rotate singly, while on the other hand disc 15 can be moved toward or away from disc 9. When disc 15 is pressed upon from above it is moved toward disc 9 against the action of spring 18 and at the same time rotates about pin 10 owing to the thread provided in the latter, thereby taking disc 9 along in rotation. When the pressure on disc 15 is released, the action of spring 18 pushes it upwards and turns both discs 15 and 9 back into the starting position. Every turning movement of disc 9 makes a difference in the flow of the refrigerant through chamber 4. If it be assumed that in the starting position illustrated in Fig. 1, in which the disc 15 is prevented from further rising by a suitable abutment which has not been illustrated, or by nuts 16, all the ports of disc 9 are fully out of register with the outlet connections and, accordingly, no flow at all of the refrigerant through chamber 4 can take place, any angular displacement of disc 9 will bring the ports into register with the outlet connections, first partly and then fully, and thereby enable a gradually increasing flow of the partly liquid partly gaseous refrigerant through the chamber 4. Conversely, starting from the lowermost position of disc 9, any angular displacement thereof will gradually bring the ports of disc 9 out of register with the outlet connections and thus shut off the flow of refrigerant. Of course, the valve may be so adjusted that even in the starting position the ports are not altogether out of register with the outlet connections and a slight flow of refrigerant takes place.

To the bottom of the member 3 an annular abutment 19 is secured, which abutment rests on disc 15. The parts of the apparatus are so coordinated to one another that below and up to the temperature at which the control device is intended to enter into operation, any pressure exerted by the member 3 on the disc 15 is so small that it does not overcome the action of spring 18. When the temperature exceeds a predetermined magnitude the pressure developing in the thermostat 1 distends the member 3 and presses the bottom of the latter down on to disc 15 whereby, as described above, the latter descends and is turned, and with it disc 9 turns. Thereby, a gradually increasing flow of the refrigerant through the chamber 4 is started. As the temperature drops within the refrigerator, so drops the pressure in the thermostat whereby the member 3 is contracted and a movement of the valve disc in the opposite direction is induced whereby the flow of the refrigerant is gradually shut off.

It is thus evident that the device described hereinbefore provides a very smooth and gradual control of the refrigerator.

Figure 3:
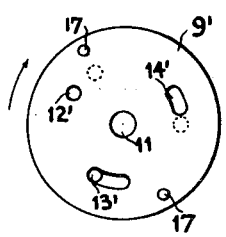
Fig. 3 is a plan view similar to Fig. 2, showing a modification of the rotary disc valve.

The variations of flow of the refrigerant can be made still more gradual by the modification of the valve disc 9' illustrated in Fig. 3. This has one circular port 12' corresponding to the port 12 of disc 9, an oblong port 14' in lieu of port 14 of disc 9 and about double the size thereof, and an oblong port 13' in lieu of the port 13 of disc 9 and about thrice the size thereof. When the disc 9' is turned to such an extent that port 12' is fully out of register with the corresponding outlet connection, ports 13' and 14' remain in register with their respective outlet connections. Further turning brings port 14' out of register, while port 13' is still in register, and yet further turning finally shuts off the last outlet connection as well. The opening of the outlets proceeds in inverse sequence.

Figure 4:
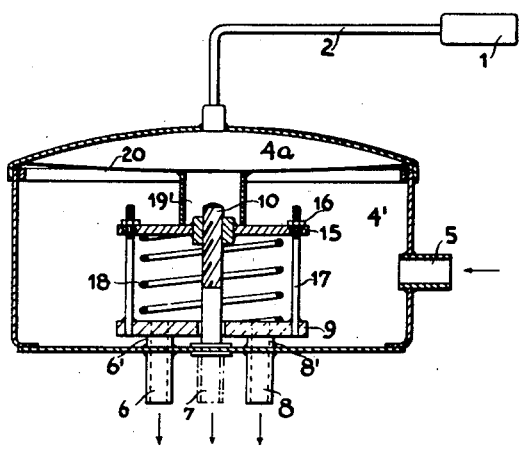
Figs. 4, 5 and 6 are elevations of a second, third and fourth embodiment of the invention respectively.
Figure 2:
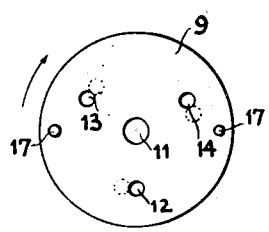
Fig. 2 is a plan view of the rotary disc valve thereof.

In the embodiment of the invention according to Fig. 4, the arrangement of the valve proper is similar to the one described in Figs. 1 and 2 the member 3 is replaced by a membrane 20 which is stretched across the top portion of the chamber 4' and divides therefrom a sub-chamber 4a that communicates with the thermostat 1 through the pipe 2. The variations of pressure in the thermostat produce the reciprocating movements of the membrane which are made to act through the annular abutment 19' of the membrane on the disc 15', corresponding to the disc 15 of the device illustrated in Fig. 1. It is obvious that the function of the device is the same as that described hereinabove.

Figure 5:
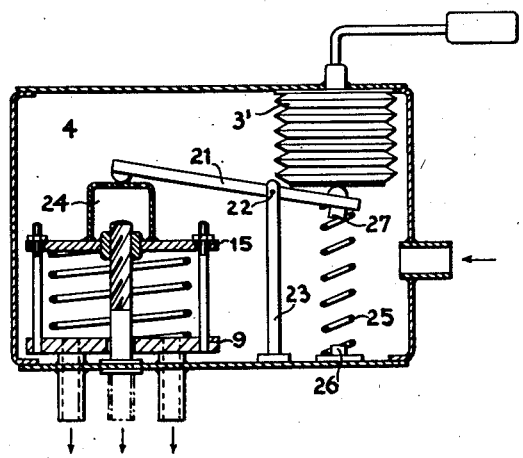

The embodiment of the invention illustrated in Fig. 5 has a member 3' similar to the member 3 of Fig. 1. Its reciprocating expanding and contracting movements are transmitted to a lever 21 which is pivoted at 22 on an upright 23 secured to the bottom of the chamber 4. The opposite end of the lever presses on a cap member 24 secured to the upper face of the disc 15. The end of lever 21 beneath the member 3' is urged upwards by a compression spring 25 propped up against the bottom of chamber 4 where a knob 26 is provided in order to prevent the spring from sliding sidewards, while a similar knob 27 is provided on the underside of lever 21 for the fixation of the upper end of the spring. As the member 3' expands, the right-hand end of lever 21 is pressed down against the action of spring 25 whereby the opposite end of the lever is raised, which allows the disc 15 to be pressed upwards by the action of spring 18. The rotary movement of the valve disc required for opening the passage of the refrigerant through the chamber 4 proceeds thus in the opposite sense as in Fig. 1.

Figure 6:
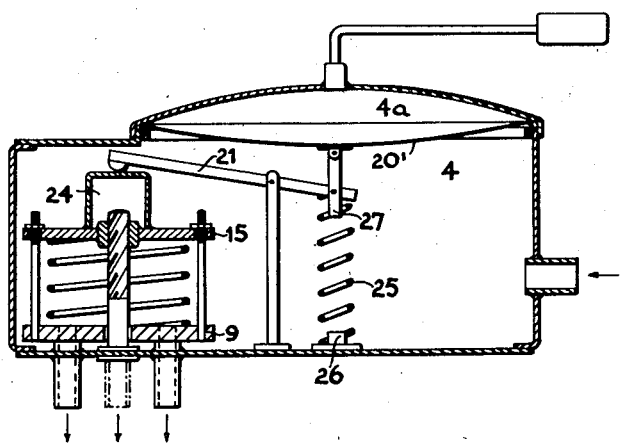

Again, Fig. 6 is self-explanatory in illustrating a device analogous to Fig. 4, with the difference that the membrane 20' presses on a lever 21 similarly as does the member 3' in the case of Fig. 5.

Figure 7:
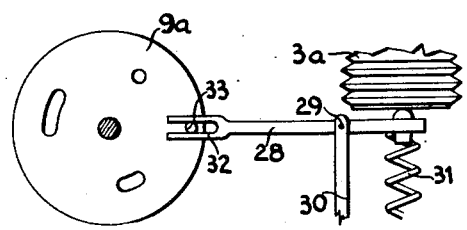
Fig. 7 shows a fragmentary diagrammatic plan view of yet another embodiment of the invention.

A yet other embodiment of the invention, illustrated in Fig. 7, does away with the screwingly movable disc 15 of Fig. 1. The member 3a, corresponding to member 3 of Fig. 1, is arranged in horizontal position and presses on one end of a lever 28 pivoted at 29 on a brace 30, a compression spring 31 being provided for counteracting the distending movement of the member 3a. The opposite end 32 of lever 28 is bifurcated and embraces a stud 33 fixed on the valve disc 9a. The expansions and contractions of the member 3a bring about oscillating movements of the lever 28 whereby the valve disc 9a is alternatingly turned in either direction.

In use, the embodiments of the invention heretofore described have a distinct advantage in the operation of refrigeration plants. A cold-storage room may be provided with a number of evaporation units, each of said units being connected to the fluid-control device of the invention, the said fluid-control device being connected at the other end to a single cooling unit. Each of the outlets 6, 7, and 8 thus lead to a separate evaporating unit, while the inlet connection 5 is attached to the cooling unit. When a pre-determined room temperature is obtained, the fluid-control device is set in motion. If the rotary disk valve shown in Fig. 2 is utilized, all of the outlets are gradually closed simultaneously. If the rotary disk valve illustrated in Fig. 3 is employed, however, each of the outlets is successively closed at a gradual rate, thus placing one evaporator at a time out of action. Should the room temperature decrease to a point where all of the liquid lines leading to the evaporators are closed, the cooling-unit pump lowers the pressure in the system and an automatic pressure control which is installed in every cooling system, shuts off the motor and thus disconnects the entire cooling unit. The process is reversed when the temperature rises and opens the fluid control outlets correspondingly. Those skilled in the art will appreciate the economy of operation of the cooling unit and the smoother operation afforded to the cooling system.

I claim:

1. A device for the control of the flow of fluid through a conduit, comprising a casing with at least one fluid inlet connection and at least one fluid outlet connection; an oscillatingly rotatable slide disc valve inside the casing in conjunction with at least one of said connections, said disc valve having a central aperture and at least one fluid passage port; a fixed spindle loosely projecting through said central aperture; a second disc having a threaded hub screwed on said spindle, a compression spring interposed between said two discs, means connecting the two discs for rotation of said discs in unison about said spindle with the angular relation of said discs remaining constant; means for enabling the distance between said discs to be varied; a thermostat outside the casing; a member inside the casing adapted to carry out reciprocating movements by the action of said thermostat, and means for transmitting the reciprocating movements of said member to said disc for screwing the latter along said spindle.

2. A device as claimed in claim 1 wherein the valve disc has several ports coordinated to a corresponding number of branches of the fluid conduit, said ports having equal dimensions and such relative position as to come simultaneously into register with the branches of the fluid conduit, and simultaneously out of register therewith.

3. A device as claimed in claim 1 wherein the valve disc has several ports coordinated to a corresponding number of branches of the fluid conduit, said ports having unequal dimensions and such relative position as to come one after the other into or out of register with the branches of the fluid conduit.

4. A device for the control of fluid through a conduit, comprising a casing with at least one fluid inlet connection and at least one fluid outlet connection; an oscillatingly rotatable slide disc valve inside the casing in conjunction with at least one of said connections, said disc valve having a central aperture and at least one fluid passage port; a fixed spindle loosely projecting through said central aperture; a second disc having a threaded hub screwed on said spindle, a compression spring interposed between said two discs, a plurality of rods joining the two discs in such a manner as to prevent relative angular displacement between them and to allow said discs to rotate in unison, said second disc being slidably mounted on said rods and being movable toward and away from said first disc, a thermostat outside said casing, a member inside said casing adapted to carry out reciprocating movements by the action of said thermostat, and means for transmitting the reciprocating movements of said member to said second disc for screwing the latter along said spindle.

5. A device as claimed in claim 4 wherein said reciprocal member is in direct contact with said second disc.

6. A device as claimed in claim 4 wherein a pivotally mounted lever is interposed between said reciprocal member and second disc and its ends are in contact with said member and disc respectively.

GUSTAV SPERLING.

REFERENCES CITED

The following references are of record in the file of this patent:

UNITED STATES PATENTS

| Number | Name | Date |
| --- | --- | --- |
| 771,287 | McLewee | Oct. 4, 1904 |
| 995,854 | Ferbranche | June 20, 1911 |
| 1,346,734 | Young | July 13, 1920 |
| 1,833,950 | Modine | Dec. 1, 1931 |
| 1,926,790 | Ploen | Sept. 12, 1933 |
| 2,141,614 | Mott | Dec. 27, 1938 |
| 2,185,914 | Gaul | Jan. 2, 1940 |
| 2,377,227 | Griswold | May 29, 1945 |
| 2,395,212 | Blanchard | Feb. 19, 1946 |

FOREIGN PATENTS

| Number | Country | Date |
| --- | --- | --- |
| 1,724 | Great Britain | 1910 |